(12) United States Patent
Wei et al.

(10) Patent No.: US 6,243,865 B1
(45) Date of Patent: *Jun. 5, 2001

(54) METHOD OF RELAYING DIGITAL VIDEO & AUDIO DATA VIA A COMMUNICATION MEDIA

(75) Inventors: Winston Ser Tuen Wei; Zhong Hua Xu, both of Singapore (SG)

(73) Assignee: Multiscience System PTL Ltd. (SG)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,878

(22) Filed: Apr. 1, 1998

(51) Int. Cl.$^7$ .............................. H04N 7/173; H04N 7/12
(52) U.S. Cl. .......................... 725/41; 725/112; 725/118; 348/416; 348/699
(58) Field of Search ................................... 348/416, 845, 348/699, 17, 18, 19, 7, 15, 385, 387, 388, 36, 39, 575, 576, 578; 345/327, 328, 355, 357, 473; 702/395; 382/248, 244

(56) References Cited

U.S. PATENT DOCUMENTS

| | | | |
|---|---|---|---|
| 5,191,410 | * 3/1993 | McCalley et al. | 358/86 |
| 5,736,977 | * 4/1998 | Hughes | 345/326 |
| 5,764,276 | * 6/1998 | Martin et al. | 348/13 |
| 5,926,208 | * 6/1999 | Noonen et al. | 348/17 |
| 5,958,012 | * 9/1999 | Battat et al. | 709/224 |
| 6,111,605 | * 8/2000 | Suzuki | 348/220 |

* cited by examiner

Primary Examiner—Andrew Faile
Assistant Examiner—Keiu-Oanh Bui
(74) Attorney, Agent, or Firm—Raymond Sun (57) ABSTRACT

A method of relaying digital video data over a communications medium such as the Internet is provided where accelerated relaying time can be realised. The method involves assembling digital data of one frame representing a scene of a video image plus data of one or more filters and parameters therefor to be applied to the digital data over a plurality of repeated frames of that scene. All that data is relayed to a users personal computer and then an apparent video movie is generated at the personal computer over a plurality of repeated frame images of the one frame by applying the filters thereto. The filters can include PAN ZOOM FADE etc., so that when applied over the plurality of frames each of the same scene, there will be an apparent motion video movie. Many scenes and filters can be employed to enhance the video. In providing a video of real estate, such as details of an apartment, a 2-D floor plan of the apartment can also be relayed so that a viewer of the apparent video can obtain a better understanding of the image being viewed at any given point of time. The 2-D floor plan can have a route-of-path line drawn thereon to further enhance the understanding of the image being viewed. A moving indicator can be displayed over the route-of-path which can be approximately synchronised with the apparent video to give an approximate indication on the route-of-path for the image being viewed at any given point of time.

15 Claims, 9 Drawing Sheets

METHOD OF RELAYING DIGITAL VIDEO & AUDIO DATA VIA A COMMUNICATION MEDIA

FIELD OF THE INVENTION

The present invention relates to a method of relaying digital video and audio data over a communications medium and relates particularly but not exclusively to such in an Internet environment.

DESCRIPTION OF PRIOR ART

Hitherto, when digital motion video data has been relayed on a communication medium such as the Internet, it has been usual for the duration of the motion video to be kept to a minimum because of the slow speed of the Internet transmission process and the very large size of the files necessary to transmit the video content. Because of the slow speed of the Internet, such as 28.8 k or 56 k, and the large file size, it has meant that a motion video image of image size of say 60×60 pixels, and 15 seconds duration can take up to 10 minutes or more to be downloaded. This is generally considered unacceptable. The resultant image quality is also generally considered unacceptable. Moreover, the width and height size is kept as small as possible to reduce the file size. Further, the frame rate is sometimes reduced from NTSC 30 frames per second or PAL 25 frames per second, to around 15 frames per second to again reduce the file size. In some instances, the picture detail of the video image is traded off by having low resolution images and consequential relatively smaller file sizes. Generally, transmission of motion video via the Internet has not been entirely satisfactory owing to the large transmission times needed to transmit the entire video content. The problem is further exacerbated if audio is to accompany the motion video transmission as the audio files are in general "wave" files and digital files in this format also have a very large file size.

It is generally acknowledged that the large file size of a video file can be reduced by a suitable compression codec such as an MPEG (Motion Picture Expert Group) codec or other codecs. The "wave" files can be similarly suitably compressed. In some motion video applications, video data and audio file data are interleaved, such as in the. AVI Video for Windows file format. In general, these techniques have not elevated video transmission over the Internet to a position where it can be considered as an efficient commercial option.

Several attempts have been made to provide enhanced video transmission over the Internet. For example, U.S. Pat. No. 5,132,792 describes a system that uses a frame dropping processes to remove predetermined frames from a transmission. In general, the more frames that are dropped, the more efficiently the video signals are transmitted however, this tends to deteriorate video quality by providing jerky video movement. Accordingly, this solution has limited application.

OBJECT AND STATEMENT OF THE INVENTION

The present invention attempts to overcome one or more of the aforementioned problems by a completely different technique. In this technique one or more frames are relayed together with data of filters and parameters therefor to be applied to the one or more frames. When received, the data of one or more frames is then self generating over many frames with filters such as ZOOM, PAN, FADE etc., applied over those frames and this results in an apparent motion video image in the final video. As a consequence of the relayed data, the resultant motion video is generated at receivers personal computers. This substantially shortens the transmission time. An example of the invention has particular application in relaying motion video and audio data via the Internet. The video and audio content is particularly suited for providing motion video information in relation real estate where motion video of buildings/apartments can be received by intending purchasers to obtain a first hand viewing before making a physical site inspection or a purchase. In the case of use in a real estate environment, the system also enables a 2-D floor plan of the real estate to be provided and a walk through path provided on the 2-D floor plan indicating the path taken of a person walking through the real estate as the video plays. This, in turn, gives an apparent indication of the position in the real estate at any given instant of the viewed video. Whilst the invention has particular application in conveying video information concerning real estate the invention should not be considered limited thereto as it has application in many other fields.

Accordingly to a first broad aspect of the present invention there is provided a method of relaying digital video data, said method involving providing a set of digital data of one frame representing a scene of a video image, assembling data of one or more filters and parameters therefor to be applied to the digital data over a plurality of repeated frames of that scene, relaying the digital data and the data of the filters and parameters therefor from one location to another location over a communications medium, and at said another location receiving and reproducing the digital data over the plurality of repeated frames with the one or more video filters and parameters therefor applied whereby to generate at the another location an apparent video movie over those reproduced video frames and whereby the transmission time over the transmission medium is less than that required to transmit digital data of a video movie of the same content if digital data of all of those reproduced video frames were transmitted.

Preferably, the communication medium is the Internet.

Preferably, the filters include one or more of ZOOM, PAN, TILT, DISTORT, MORPH, FADE and other effect filters.

Preferably, the video content is of a two dimensional area and a floor plan of that area is simultaneously displayed at said another location together with a route-of-path over the 2-D area, and a marker indicator is provided which progresses along the route-of-path in accordance with the particular image being viewed in the video whereby to provide an apparent location of where the image is being viewed at any given time.

Preferably, audio data is also transmitted from the one location to said another location so that when the video is generated at said another location, the audio component can be reproduced with the video component.

BRIEF DESCRIPTION OF THE DRAWINGS

In order that the invention can be more clearly ascertained a preferred example for use in a real estate environment will now be described with reference to the accompanying drawings wherein:

FIGS. 2a through 2e are a series of diagrams time synchronised to one another showing:

Figure 1:
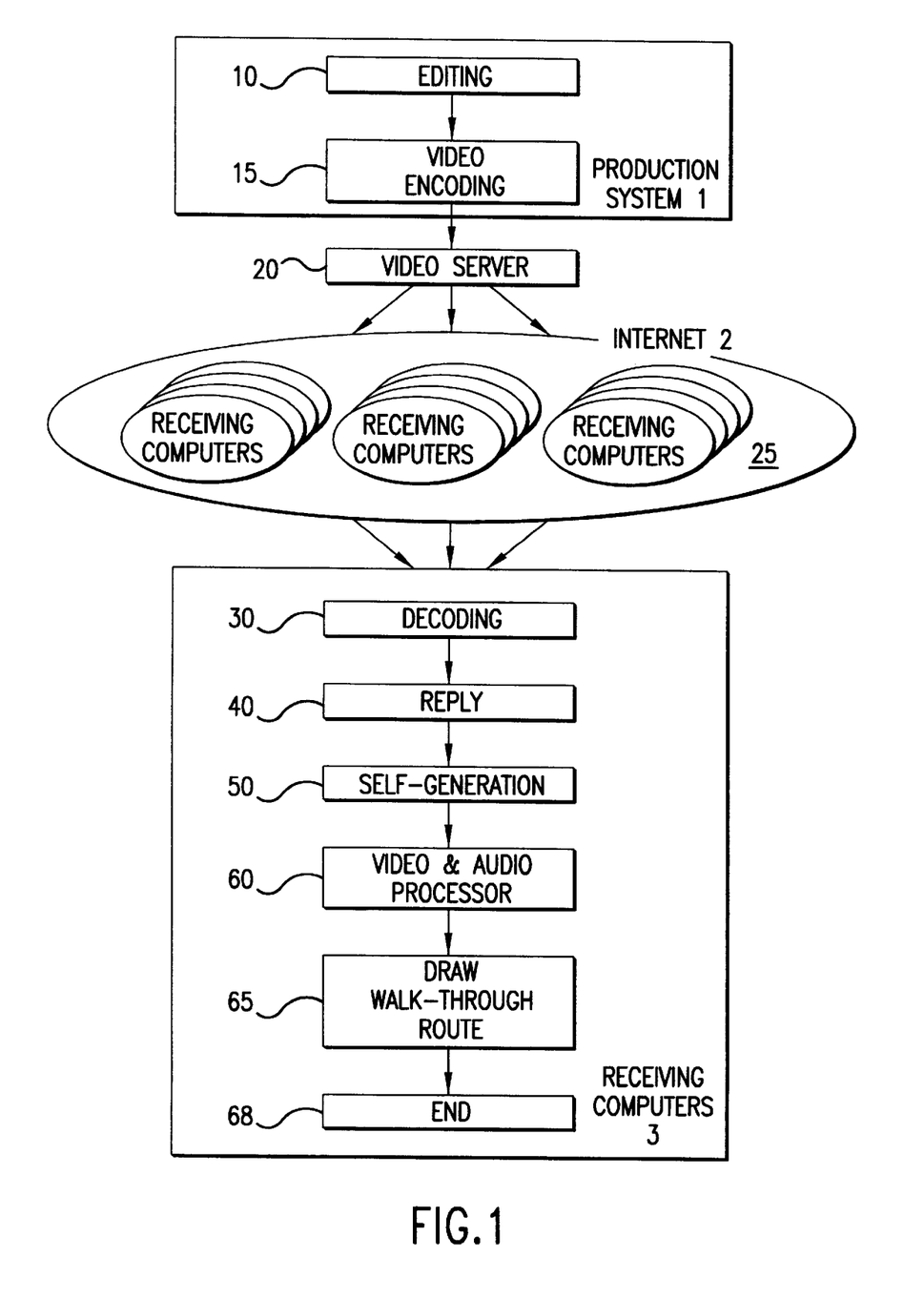
FIG. 1 is a block schematic diagram showing functional descriptions of processes involved.

Referring firstly to FIG. 1 it can be seen that the preferred method for use in a real estate environment is implemented in a system which comprises three primary blocks comprising:

a production system 1, the Internet 2 as a communication medium, and one or more receiving computers 3. Whilst FIG. 1 shows only video encoding in the production system 1, it should be understood that both video and audio can be encoded and used in the method. In a broader sense, only video may be encoded and transmitted without audio. A video server 20 is provided as a means to store the video/audio data relating to individual items of real estate which can be accessed by receiving computers 3.

Reference will firstly be made to FIGS. 2a through 2e, and FIGS. 3 through 7 in order to obtain an understanding of the system. Reference will then be made again to FIG. 1, and then to FIGS. 8 through 12 for a detailed explanation of other aspects of the system.

Firstly, it should be understood that the motion video image which a user observes at a monitor of a receiving computer 3 is generated at the receiving computer 3. There is no corresponding video at the video server 20 but rather information which can be utilised to enable a receiving computer 3 to self generate a motion video sequence from still frame images.

In a very simple system, if a video sequence to be observed by a person on a monitor of a receiving computer 3 is to be say 20 seconds long, the video sequence could be made up from a single still frame picture image.

In other words, if the video frame rate is 15 frames per second then the video could be made up from 15×20 identical images. A video of that nature would not appear to have any motion when viewed on a monitor of a receiving computer 3 because all frames would be identical in content. For this video it is only necessary to transmit one frame of the picture frame image and then to self generate the remaining frames at the receiving computer. Accordingly, in the simple system referred to above, digital data representative of the image of a single frame can be relayed over the transmission medium—the Internet 2—and received in a receiving computer 3, and then the computer 3 will self generate the video locally. The video image then viewed by a viewer on the monitor screen of a receiving computer 3 would appear as a stationary image for the duration of the video—20 seconds.

If motion is to be observed in the video content then an apparent moving video image can be created by the self generation at the receiving computer 3 if that receiving computer 3 knows how to manipulate the video image of the single still frame for each particular frame of the 20 second period duration.

Accordingly, when a video image is created for relaying over the transmission medium by the production system 1, it is also produced with information concerning the way the image is to be manipulated. Throughout the specification we refer to the way in which the video image is manipulated by the use of term "filters". These filters can comprise one or more of ZOOM, PAN, TILT, DISTORT, MORPH, FADE etc and also transition effect filters, as will be discussed in relation to a more complex example.

If it is assumed that a ZOOM filter is applied to the image of each of the frames in the video sequence, and that the zooming progresses from one frame to the next frame etc over the duration of the video sequence, then an observer of a monitor screen on the receiving computer 3 will have the impression of an apparent motion video sequence because the image will appear to be changing.

Accordingly, it can be appreciated therefore, that the time taken to relay the single frame image, together with information concerning the duration of the proposed video sequence, and information concerning any filters to be applied, will be far less than that required to relay a complete motion video sequence from the video server 20 where each frame is relayed one after the other. Thus, with the system that is proposed, the relaying time over the transmission medium is substantially less than that required to relay digital data of a motion video movie of the same content if digital data of all those reproduced video frames were transmitted.

If the video image of a still frame is compressed according to a particular codec, further efficiencies can be obtained with regard to the relaying time over the communications medium.

The codec used for compression of the still frame image of the scene can be any particular codec and is not limited solely to MPEG or JPEG or the like. However, it is preferred to use a JPEG compression codec as it is readily available and operates reasonably satisfactorily.

Figures 2A, 2B:
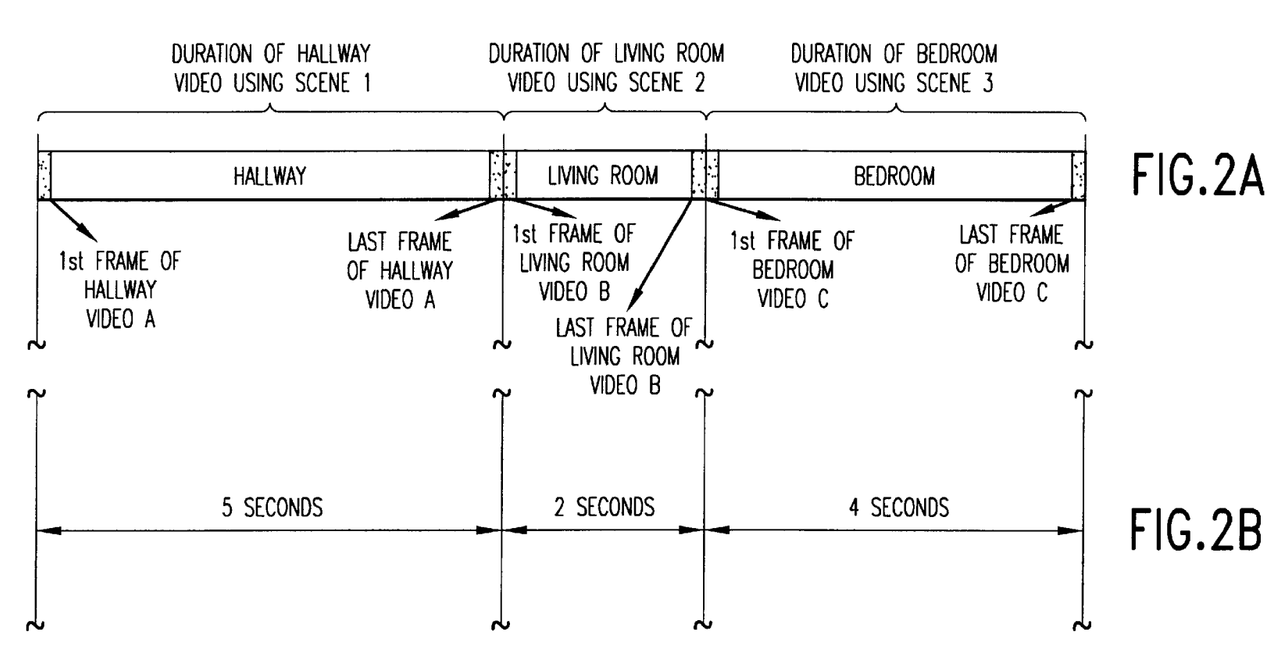
In FIG. 2a, a type of video time-line for three scenes.
In FIG. 2b, a time duration for each of the scenes.
Figure 3:
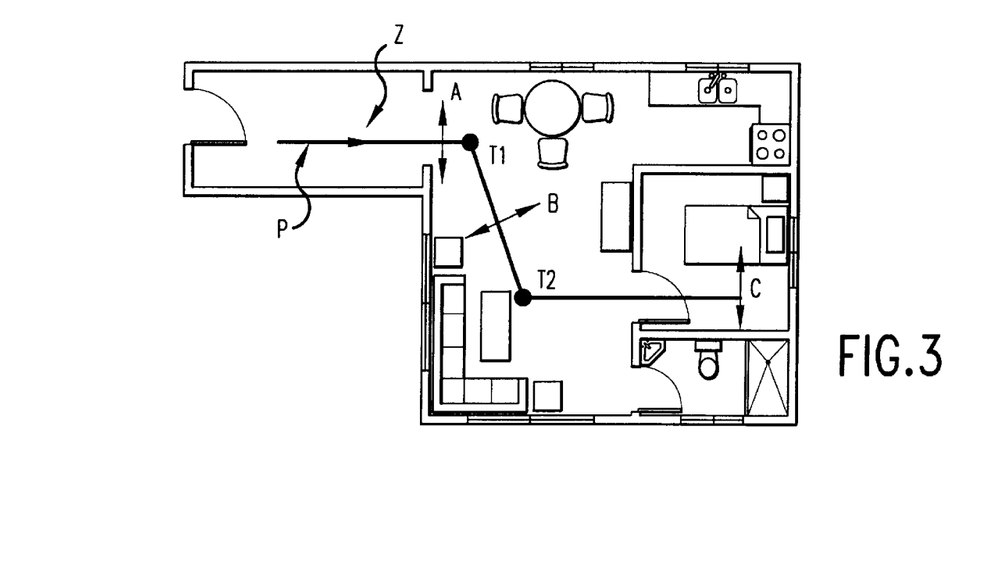
FIG. 3 is a 2-D floor plan of real estate and a walk through route-of-path therein.

FIG. 2a shows a type of video time-line representation of three scenes. It can be seen that scene 1 is an image of a hallway, scene 2 an image of a living room, and scene 3 an image of a bedroom. In FIG. 3 there is shown a floor plan in 2-D format of real estate in the form of an apartment scene 1, being the hallway, and this is diagrammatically shown as having a picture image plane represented by plane A. Scene 2, being a living room, is represented by a picture image plane B. Scene 3, being a bedroom, is represented by a picture image plane C. Thus, in order to provide an apparent video of the apartment, three picture frame images A, B and C are provided to provide a total video sequence of a duration of 11 seconds. This is shown in FIG. 2B. The duration of the hallway video part of the total video sequence has a duration of 5 seconds. The duration of the living room part of the video has a duration of 2 seconds. The bedroom part of the total video sequence has a duration of 4 seconds. The time-line shown in FIG. 2a shows only the first and last frames of each of the individual video parts. It also shows that the video part for the living room buts with the video part for the hallway. It also shows that the bedroom part of the video buts with the living room part of the video.

Figure 2C:
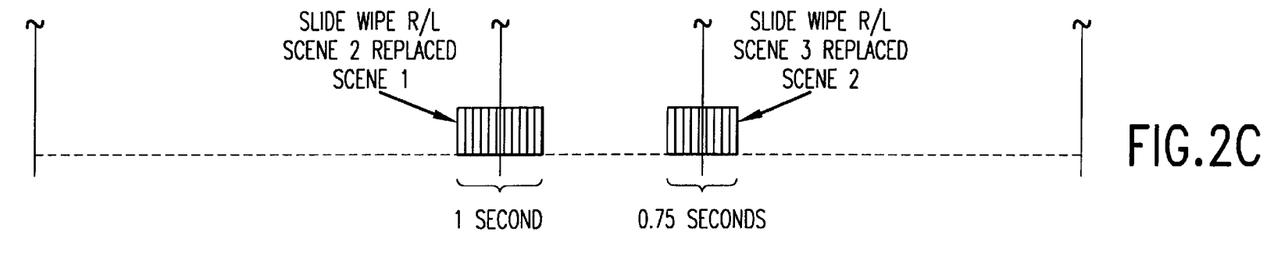
In FIG. 2c, a duration, commencement and end times for various transition filters.

FIG. 2c shows a transition in the form of a "RIGHT/LEFT SLIDE WIPE" at the end of the hallway video and the start of the living room video. It also shows a similar transition at the end of the living room video, and the start of the bedroom video. The time durations of the transitions have been arbitrarily shown as 1 second and 0.75 seconds respectively. The transitions could occur over any given time period. Desirably, for a "SLIDE WIPE TRANSITION" which is from right to left, the apparent wipe speed should approximate the apparent speed of a person walking through the apartment along a route-of-path P (see FIG. 3). Thus, in the examples, shown in FIG. 2c with the particular transitions shown, the transition from the living room to the bedroom is slightly faster than the transition from the hallway to the living room. This will have the apparent effect in the video of a person walking quicker at the transition between the living room and the bedroom than at the transition between the hallway and the living room. The transitions are interpreted herein as certain filters.

Figure 2D:
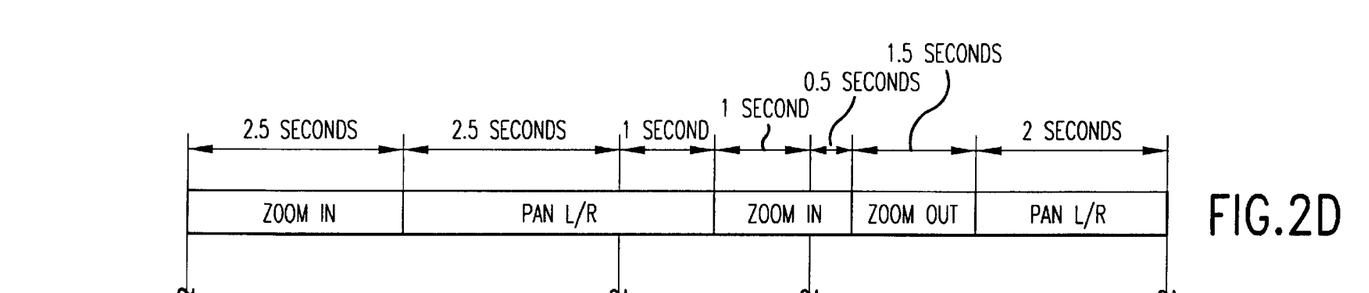
In FIG. 2d, a time-line representation of further filters.

FIG. 2d shows that for a 2.5 second period of the hallway video there is a ZOOM IN filter applied and that for the remaining 2.5 second period of that video, there is a PAN filter applied. The PAN filter also extends for a period of 1 second into the living room video. It next shows a ZOOM IN transition for the remaining 1 second period of the living room video and that that ZOOM IN filter is applied for a 0.5 second period over the bedroom video. It also shows that for a further 1.5 second period of the bedroom video, a ZOOM OUT filter is applied and that for the balance of the 2 second bedroom video there is a PAN left to right filter applied.

Figures 4, 5:
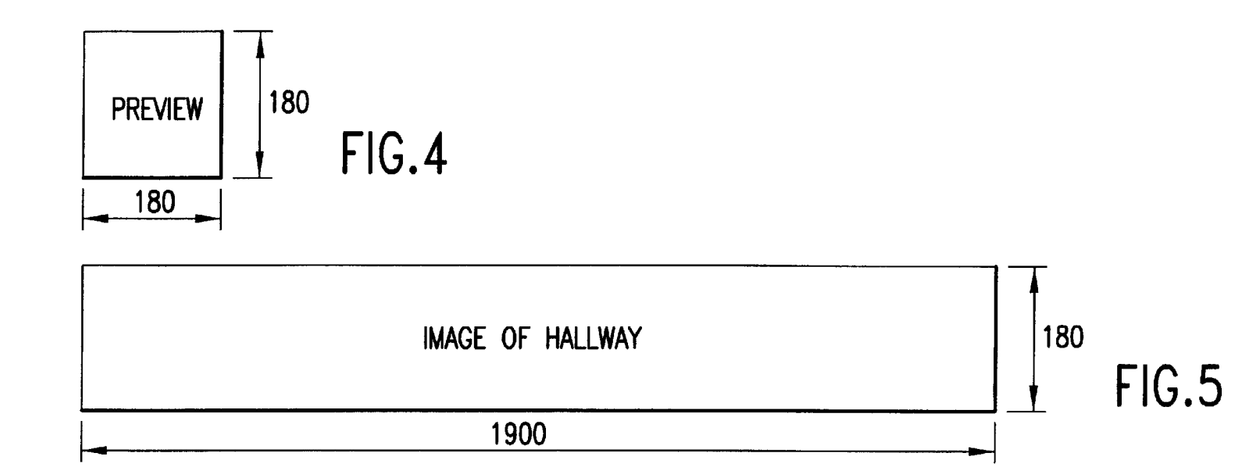
FIG. 4 is a diagram of a viewing preview window on a receiving computer.
FIGS. 5, 6 and 7 show diagrams of the image sizes of the scenes 1, 2 and 3.

Referring now to FIG. 4 it can be seen that a preview window 4 is available on the monitor screen of a receiving computer 3. Typically, this preview window can have any size and any aspect ratio. It has been arbitrarily shown as having a height of 180 and a width of 180 pixels but of course any desired size and aspect ratio could be utilised. FIG. 5 shows the size of the image for the hallway image which has a height of 180 and a width of 1900 pixels. These dimensions are also arbitrary but because the height 180 equals the height 180 of the preview window 4, the height images correspond with what will be displayed in the preview window 4.

Figure 6:
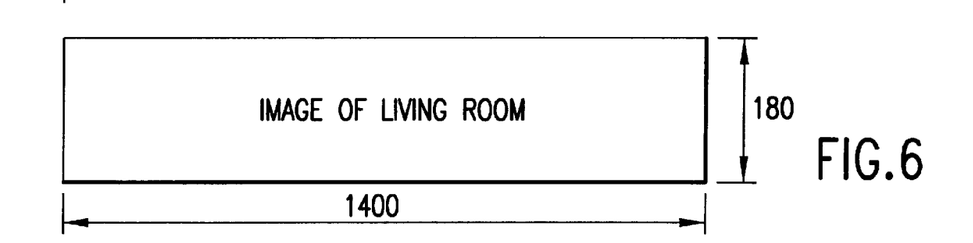
Figure 7:
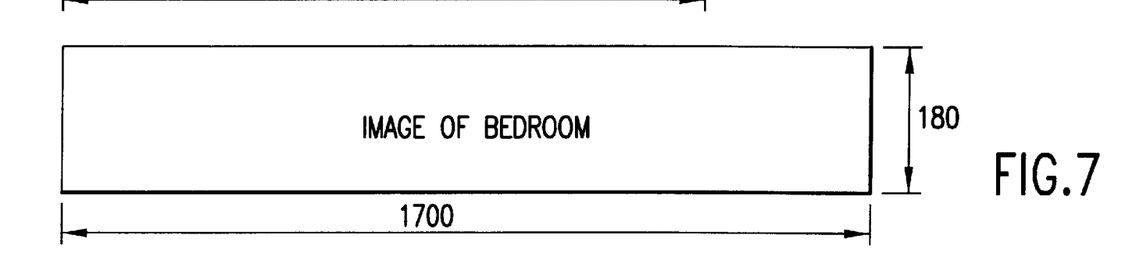

Similar arrangements are shown in FIGS. 6 and 7 for the images of the living room and of the bedroom. In each case the height is still 180 whereas the lengths are 1400, and 1700 respectively. Each of these images is available at each frame in the total video sequence for the hallway video part, the living room video part, and the bedroom video part respectively. Because the widths are greater than the preview window width then it is possible to provide relative movement between the preview window 4 and the images of the hallway, the living room, and the bedroom, to give an apparent movement by applying a PAN filter. If the height of the images of each of the hallway video, living room video and bedroom video were greater than 180 it would be possible to PAN up or DOWN as well. If PANNING is effected past the sides and or top or bottom of the images then there will be MASKS appearing in the preview window which is undesirable. The intention is to provide an apparent continuous video through the preview window 4 and any MASKS which would occur as a result of over PANNING would destroy the apparent video motion.

Summarising, the preview window has particular dimensions for width and height, and the particular images in each frame for the hallway part of the video, the living room part of the video, and the bedroom part of the video have a much greater width than the width of the preview window. Accordingly, it is possible for a relative PANNING motion to appear through the preview window 4 by scanning across the respective images. As each frame in the video section for the hallway, the living room, and the bedroom, are respectively identical, there will appear through the preview window an image, which represents a ZOOMING down the hallway, a PAN from left to right with a transition of a SLIDE WIPE between scene 2 and scene 1 representing movement into the living room. There will then be a further ZOOM IN in the living room followed by continuous ZOOMING IN to the bedroom, with a SLIDE WIPE transition between the living room and the bedroom. There will then be a ZOOM OUT in the bedroom followed by a further PAN left to right.

All of the above can be created at the receiving computer 3 by relaying a single picture frame image of each of the hallway scene, the living room scene, and the bedroom scene. Thus, only three single frame images need to be relayed via the communications medium together with information concerning the duration of each of the video components, together with the particular filters which are applied, and the start and end times of the filters. Thus, it can be seen that one or more filters are applied together with parameters therefor and that these are utilized at the receiving computer 3 to self generate an apparent video from only three single frame images. All the missing frames are reconstituted at the receiving computer 3 according to the parameters of the filters and the parameters associated with each of the respective frame images ie the time duration for each of the picture frame images in the video sequence.

Figure 2E:
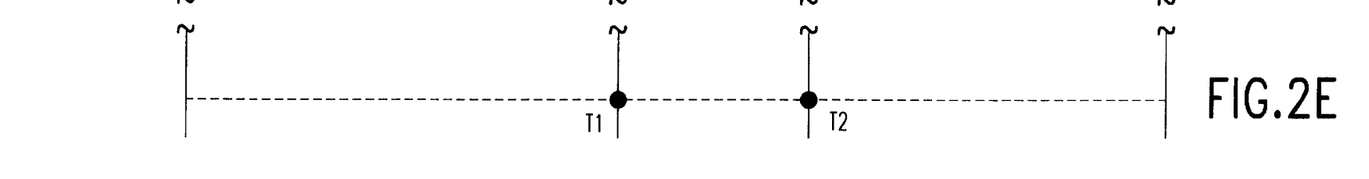
In FIG. 2e, timing points T1 and T2 of the end of scene 1 and start of scene 2, and the end of scene 2 and the start of scene 3.

Returning now to FIG. 3 it can be seen that an indicator arrowhead Z is shown on the route-of-path P. The arrowhead Z is caused to move along the route-of-path P as viewed on the monitor screen of a receiving computer 3 to provide an indication approximately where a viewer is in the apartment. In other words, there is a 2-D floor plan of the apartment shown in FIG. 3 with a route-of-path P shown thereon and an arrowhead Z to indicate the approximate position at any given instant during the playing of a video as observed through the preview window 4. FIG. 2e shows transition times T1 and T2 representing the transitions between the hallway part of the video and the living room part of the video, and the living room part of the video and the bedroom part of the video respectively. These time periods T1 and T2 are used to tell controlling software which moves the arrowhead Z along the route-of-path P that it is to change the direction at the transition time T1 or T2 etc. Thus, as a viewer plays a video and operates conventional video player stop, start, pause, rewind buttons which can be displayed on the monitor of the receiving computer 3 concurrently with the video, the video can be made to play, start or stop, pause etc. and the arrowhead Z will assume a position along the route-of-path P which approximates the position of a person on the route-of-path P at that time. Normally, the arrowhead Z moves continuously along the route-of-path P in accordance with the playing of the video.

Clearly, an apparent video can be made up from a number of different single frame images representing each of the rooms of an apartment or indeed any other area. A 2-D floor plan of the area can be provided together with a route-of-path which indicates the path of a person walking through the area. The single picture frame images can be related to the position of the person walking through the area, and by applying various filters there can be provided an apparent video of the 2-D area.

It should also be realised that the video can be of a 3-D volume depending on the particular images of the single picture frames and the particular PANS and other filters applied thereto. Thus, there can be an apparent three dimensional movement. In this case, other 2-D representations can be provided to indicate vertical planes, and a route-of-path can be shown on those planes in a similar manner to the route-of-path on the 2-D plan format shown in FIG. 3. Thus, on the monitor screen of a receiving computer 3, there may be provided several diagrams similar to FIG. 3 but representing plan views, and side elevational views etc. with appropriate route-of-paths drawn thereon together with appropriate arrows on the routes-of-paths. The picture images can be assembled into a digital file together with the parameters relating thereto, including the timing of the duration of each of the video components for each of the still frames and the various filters applied thereto. In the preferred embodiment we store this information in a file with a .MSD file extension. The transition timing information relating to T1 T2 etc as referred to in relation to FIG. 2e is stored in a file with a .TRK extension. Data representative of the floor plan in 2-D format as shown in FIG. 3 can be represented in a vector, bitmap or other compatible format as a file with a .MGM file extension. These file extensions have arbitrarily been provided by ourselves however, any file extensions can be utilized. Typically, the video picture images for each frame are compressed according to the JPEG codec, although they may be uncompressed images such as in a bitmap file or other file.

Thus, when a receiving computer 3 makes contact with the video server 20 via the Internet, it accesses these three types of file types and then at the receiving computer 3 a video is generated from the still picture frame images. If desired, audio may accompany the video .MSD files. This audio may be compressed, if desired, according to a particular codec. Thus, when received at the receiving computer 3, it can be uncompressed by that codec.

Returning now to FIG. 1, and with particular reference to the production system block 1, it can be seen that there is an editing block 10. Here, the particular still frame images used to create the entire video are assembled. In the case of the examples shown in relation to FIGS. 2a through 2e there are three scenes of picture images. These scene images are then presented to the video encoding block 15 where they are compressed according to a particular codec such as the JPEG compression codec. The video server block 20 is provided to store all the data files necessary for the video display including the .MSD files, the .MGM files and the .TRK files. Audio files may also be included. The video server transmits all the files to a receiving computer 3 when a receiving computer 3 request the playing of a video from the Internet address site of the server 20. When the request has been made from the receiving computer 3 to the video server 20, the downloading and decoding is identified in the receiving computer 3 in decoding block 30. The receiving computer 3 will then wait for a request from a reply block 40 to self generate a playable motion video from the digital data which has been transmitted. This is shown in the self generation block 50. The video and audio processor block 60 enables the video and audio from the self generated motion video to be displayed on the monitor of the receiving computer 3. As discussed before, a video player arrangement can be provided on the monitor screen to simulate the normal buttons of a video recorder/player such as stop, play, pause, rewind etc. At the same time as the video and audio processor 60 is processing data, the draw walk-through-route block 65 processes the 2-D floor plan information from the .MGM file and displays the route-of-path thereon. It also processes the TRK file which controls points of transition of movement of a position indicator in the shape of the arrowhead Z over the route-of-path P. The draw walk through route block 65 can also check to see if the video has played in its entirety such that the end block 68 can automatically return the video to its start point for subsequent replaying.

Figure 8:
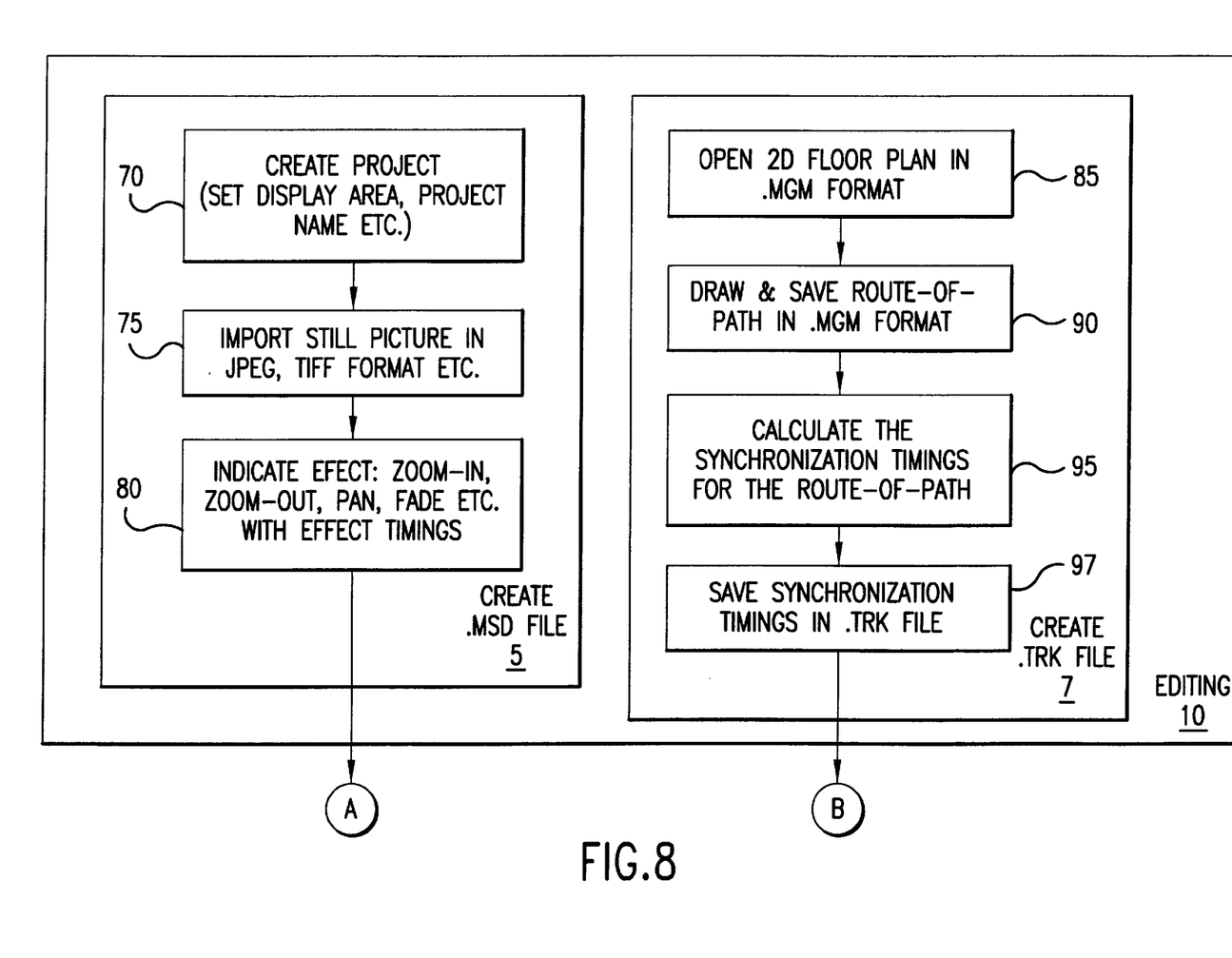
FIGS. 8 and 9 show interconnected functional diagrams of a "production system" and connection with the Internet.

Referring now to FIG. 8 it can be seen that there are two subsection blocks being create .MSD file 5, and create .TRK file 7. In the create .MSD file block, it is necessary to define some of the parameters relating to the video information which is to be assembled. These are, project name (project name .MSD), preview window display area eg 180×180, 240×180 etc. which represents the pixel size. This all occurs within the block 70 which is a sub-block of the create .MSD file 5.

It is then necessary to import the still picture scenes in JPEG, TIFF, BITMAP, or other formats to a work space. This occurs in block 75 which is a further sub-block of the create .MSD file 5. It is then necessary to specify the duration of the video parts, and to apply effects to the still picture scene images such as ZOOM IN, ZOOM OUT, PAN, FADE, MORPH, and the like, together with the various start times and end times for those effects. It is also necessary to apply transition filters if they are required, between the ends of the video portions made from each of the still picture images. These transitions may be PAN left to right, PAN right to left, PAN up and down, PAN down up, and other known transition filters. All of these filters are assembled in the block 80 which is a sub-block of the create .MSD file 5.

In the create .TRK file block 7, a 2-D floor plan is firstly opened in the sub-block 85. The 2-D floor plan can be a vector or bitmap based drawing and has been provided with a .MGM file extension as an arbitrary extension.

A route-of-path P is then drawn on the 2-D floor plan as a polyline that is made up of one or more straight lines. The example in FIG. 3 shows the walk through route-of-path P having three straight lines. As the route-of-path P is to correspond to particular time instances relative to the picture images in the .MSD files, it is necessary to manipulate the route-of-path so it will fine tune and be in synchronisation with the resultant video. At present this is done by trial and error by manipulating the length of the individual straight lines in the route-of-path and the particular angles of intersection. The timings T1 and T2 etc at the change of direction points is also manipulated slightly so that they approximately correspond with the resultant video image. This synchronisation is performed in block 95 in the create .TRK file 7. The resultant information is then saved in a .TRK file in block 97.

Figure 9:
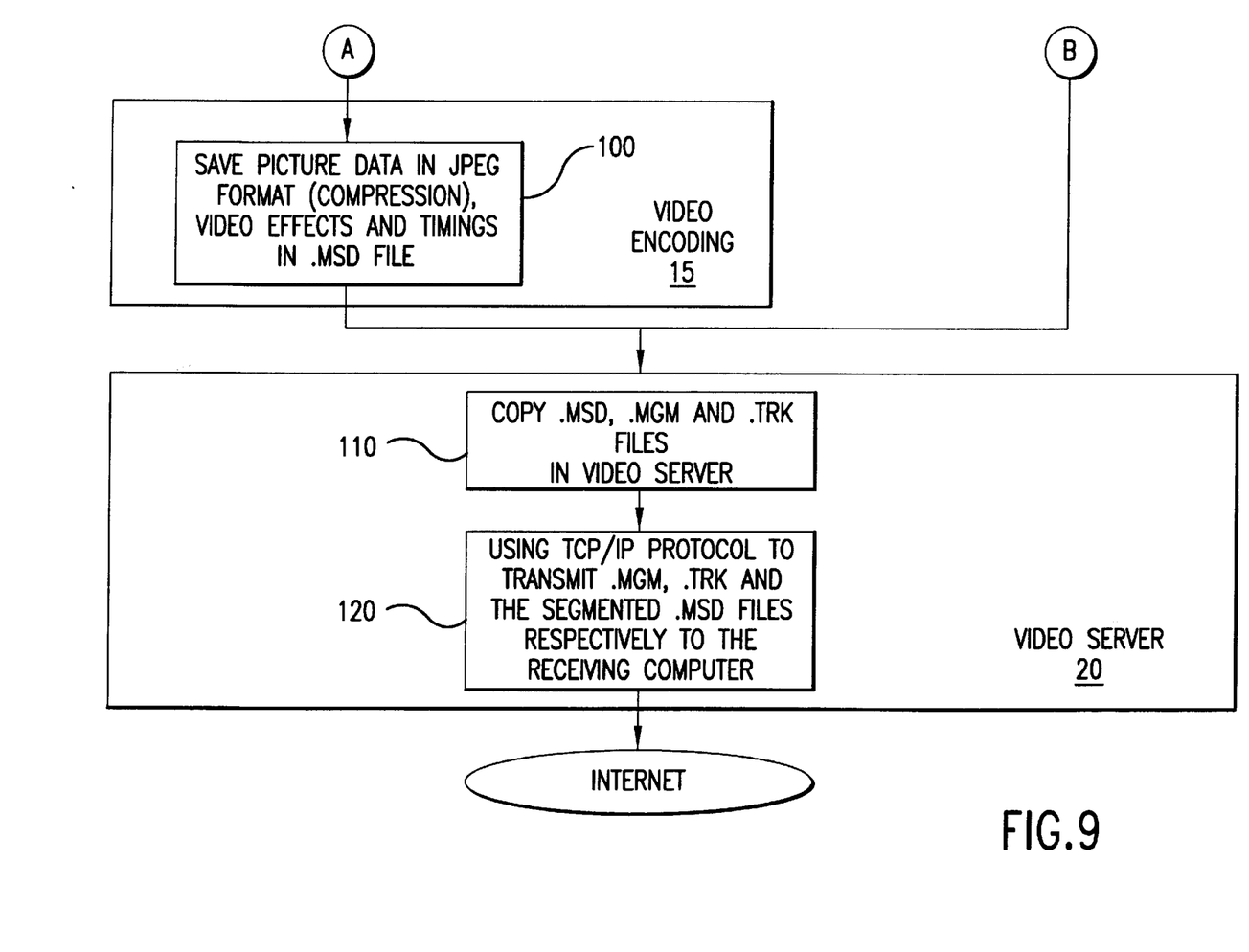

FIG. 9 shows a flow diagram of the functions associated with video encoding block 15 where the picture data from the create .MSD file block 5 is saved in an MSD file block 100. The resultant picture data, with the video effects and timings in the .MSD file is then brought together with the information in the .TRK file and copied into the video server 20 in block 110. The information is saved in hard disk in the video server 20 and can be accessed via the Internet using TCP/IP protocol.

In the video encoding block 15, the still picture scene images are compiled with effects and timings with a JPEG (Joint Photographic Expert Group) codec compression screen. This will reduce the .MSD file size by about 25 times its original size. It will then be saved as a .MSD file for viewing via the Internet. In the video server block 20, three kinds of files are copied to specific directories. These files are the .MGM files, .MSD files, and the .TRK files. Within the video server 20, a program is run to facilitate relaying of the three types of files of each video to the receiving computers as requested by using TCP/IP protocol. A multi-thread system can be utilized to connect each of the receiving computers 3 to each thread to facilitate requests from the receiving computers 3. This will increase the efficiency of the video server 20 to the receiving computers 3. Typically the video server 20 can be connected to the Internet using an ISDN line (eg 64 K to 384 K bit-sec or higher capacity bandwidth line such as a fibre optic line which can have data transfer rates up to megabits/sec).

Figure 10:
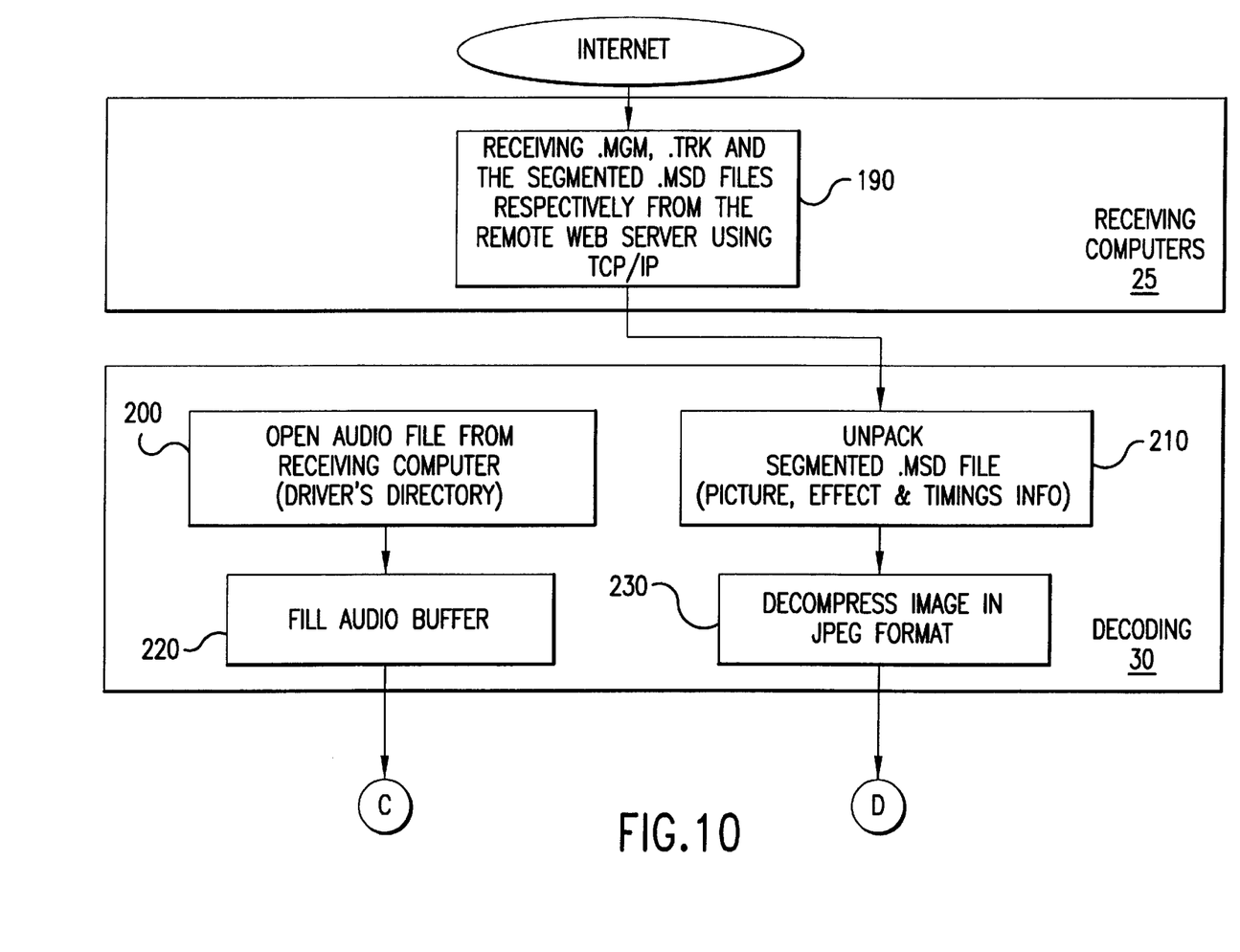
FIGS. 10 through 12 show functional diagrams of a user connecting with the Internet and downloading video and audio files and subsequently reproducing the video/audio at the users PC.

Referring now to FIG. 10 there is shown a breakdown of the decoding block 30 which occurs within the receiving computer 3. Typically, the receiving computers 3 are connected to the Internet via a modem dial-up or LAN based connection. The interacting software with the Media Server program residing in the receiving computer 3 is an Internet Browser Plug-in which is compatible with Microsoft Internet Explorer 3 and 4 and Netscape 3 and 4. It requests the necessary files ie .MGM, .TRK and .MSD files respectively from the server 20 using TCP/IP.

In the decoding block 30 (FIG. 10) there are two paths. One path is for audio and the other path is for video. The audio is processed within the blocks 200 and 220 and the video is processed within the blocks 210 to 230. Thus, the audio file which is pre-stored in the plug-in directory of a receiving computer 3 when installing or updating of the Internet plug-in, so that for audio, an audio file is opened in block 200 and is assembled ready for playing in a buffer in block 220. The video is unpacked in block 210 and is decompressed using the JPEG codec in block 230.

Figure 11:
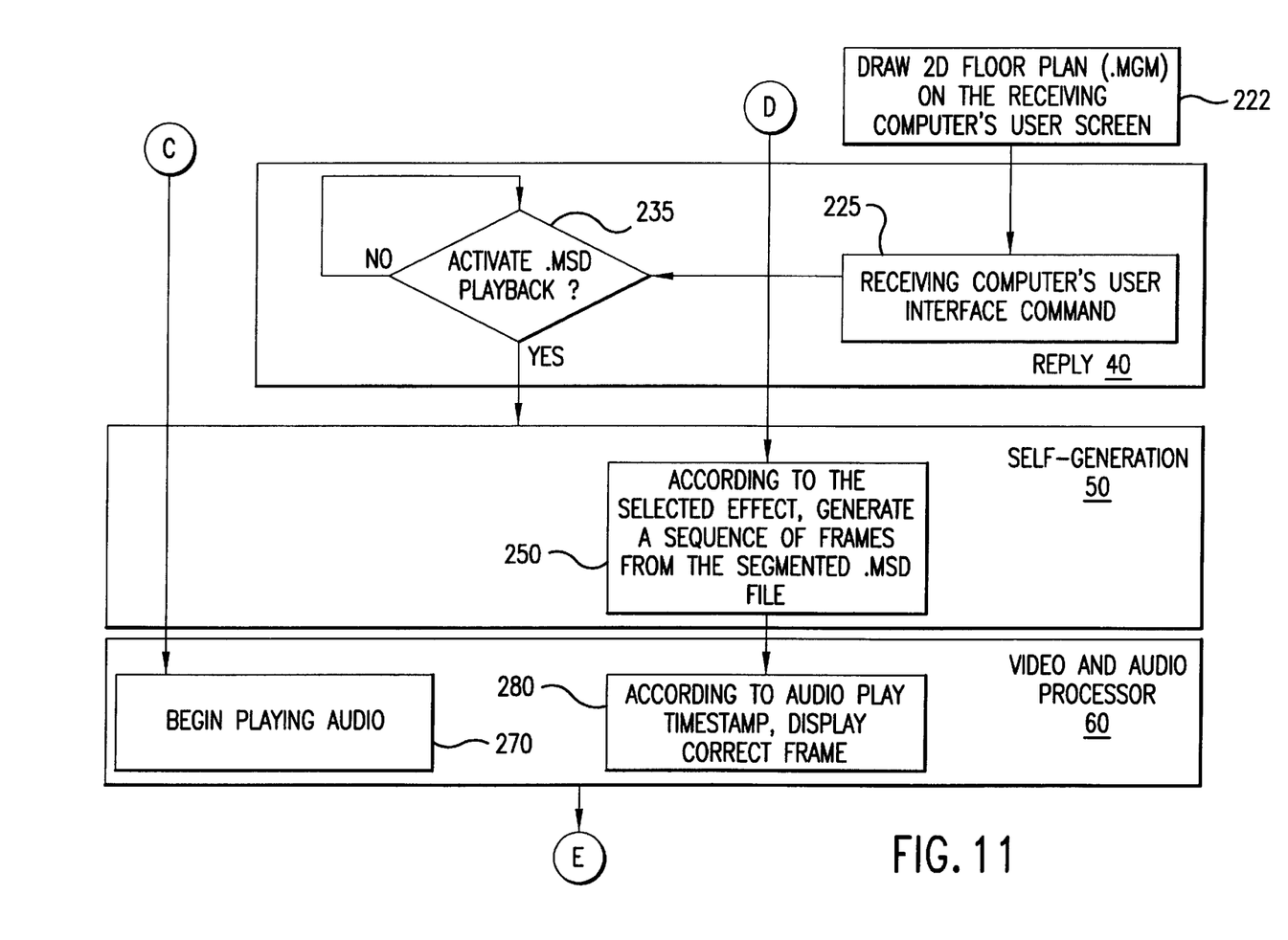

FIG. 11 is a flow diagram of the self generation block 50 shown in FIG. 1. The 2-D floor plan is drawn onto the Internet browser window using the downloaded Internet plug-in written in C++ as it is received from the video server 20. Within the plug-in, there are interfaces that allow the user of a receiving computer 3 to manipulate the 2-D floor plan such as magnify or de-magnify and allows Play, Pause, and Stop functions within the block 235. The plug-in interface enables activation of the video by clicking either the play button or by directly clicking on the route-of-path P polyline while still receiving unpacked .MSD files. The .MSD files will be decompressed and all the necessary frames to create the video segment will be produced in the self generation block 50 in accordance with the sub-block 250. The audio component begins playing concurrently with any video and is synchronised with block 270 and block 280.

Figure 12:
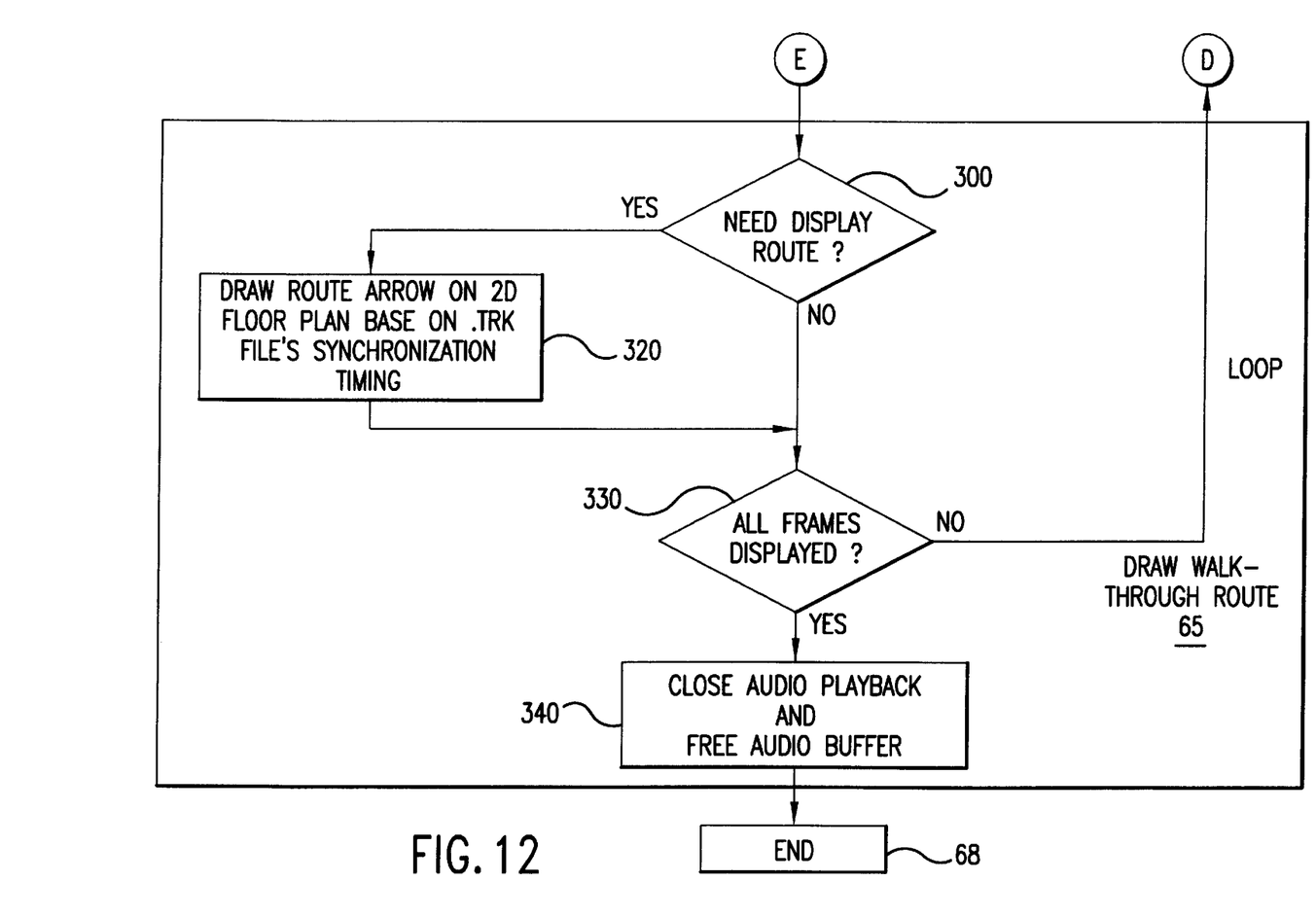

FIG. 12 shows a flow diagram of the floor walk-through block 65 and shows that the display route is provided as a decision process as block 300 and the arrow head Z is drawn on the 2-D floor plan in block 320. Interrogation is made at decision 330 whether the video has been completed in its entirety. If it has, the audio playback and audio buffer are closed in block 340. If it has not the process re-loops.

Whilst the above system has been described for a particular application in relation to real estate, it should be appreciated that it can be applied to other areas and fields and is not limited solely to real estate areas.

It should also be appreciated that audio files such as music files are loaded during installation of the plug-in. Any audio files can be updated from time to time by simply reloading the plug-in once again. Many audio files such as music files can be loaded with the plug-in, and can be arranged to be randomly selected during playing of a video, to provide variation to the accompaniment of the video.

Particulars of some algorithms associated with certain filters are set out below:

ZOOM IN effect
Suppose:
1. Effect time: 0~T
2. At time 0: Image is I(O,O,W,H)
   W is the width of still picture
   H is the height of still picture
3. At time T: Image is I(xT,yT,wT,hT)
   xT is left position
   yT is top position
   wT is width
   hT is height
Then at time t (from 0 to T): Image is I(x,y,w,h)
$x = xT*t/T$
$y = yT*t/T$
$w = W-(W-wT)*t/T$
$h = H-(H-hT)*t/T$ ZOOM OUT effect
Suppose:
1. Effect time: 0~T
2. At time 0: Image is I(xT,yT,wT,hT)
   xT is left position
   yT is top position
   wT is width
   hT is height.
3. At time T: Image is I(O,O,W,H)
   W is the width of still picture
   H is the height of still picture
Then at time t (from 0 to T): Image is I(x,y,w,h)
$x = xT*(T-t)/T$
$y = yT*(T-t)/T$
$w = W-(W-wT)*(T-t)/T$
$h = H-(H-hT)*(T-t)/T$

FADE effect: (one picture fades in and another fades out)
Suppose:
1. Effect time: 0~T
2. At time 0: Image is I(O,O,W,H)
   W is the width of the still picture I
   H is the height of the still picture I
3. At time T: Image is I' (O,O,W,H)
Then at time t (from 0 to T): Image is i(O,O,W,H)
p(x,y) is the pixel value (colour or grayscale) in position (x,y)
if, I and I' are 8-bits (256 colour or grayscale) Image
   $p(x,y) \approx (pI(x,y)*t + pI'(x,y)*(T-t))/T$
else if I and I' are true colour image
   $p(x,y)\_R = (pI(x,y)\_R*t + pI'(x,y)\_R*(T-t))/T$
   $p(x,y)\_G = (pI(x,y)\_G*t + pI'(x,y)\_G*(T-t))/T$
   $p(x,y)\_B = (pI(x,y)\_B*t + pI'(x,y)\_B*(T-t))/T$
Last formula can be improved to reduce calculation time PAN effect (from left to right)
Suppose:
1. Effect time: 0~T
2. At time 0: Image is I(O,O,W,H)
   W is the width of the still picture I
   H is the height of the still picture I
3. At time T: Image is I' (O,O,W,H)
Then at time t (from 0 to T): Image is i (O,O,W,H)
p(x,y) is the pixel value (colour or grayscale) in position (x,y)
if $x+W*t/T<W$
$p(x,y) = pI(x+W*t/T, y)$ else
$p(x,y) = PI'(x+W*t/T-W, y)$ Perspective Display effect:

Sometimes we display the picture on the screen with just a size change, however, we also can display the picture in rational distortion mode to produce a perspective effect.

Suppose:
Image is I(O,O,W,H)
W is the width of the still picture
H is the height of the still picture
The four corner's coordination is (xs[4], ys[4])
xs[0]=0, ys[0]=0
xs[1]=w, ys[1]=0
xs[2]=W, ys[2]=H
xs[3]=0, ys[3]=H
The display area is a four points polygon (xd[4],yd[4])
Then transforming from (xs[4],ys[4]) to (xd[4],yd[4]).

xs[4], ys[4]            xd[4], yd[4]

For a point p(x,y) in left plane, suppose mapping to point p' (x' y') in right plane, we can list the simultaneous equation:

x1=x+

(a[0]*(x-xs[0])+a[1]*(y-ys[0]))/

(a[2]*(x-xs[0])+a[3]*(y-ys[0])+10.0)

y1=y+

(a[4]*(x-xs[0])+a[5]*(y-ys[0]))/

(a[2]*(x-sx[0])+a[3]*(y-ys[0])+10.0)

a[6] is coefficients for solving simultaneous equation.

If we display the picture with only a size change, the last formula can be simplified because the display area is a rectangle (X',Y',W',H'):

x1=X'~x*W'/W y1=Y'+y*H'/H

Other filters can be applied and the algorithms associated with these other filters can be determined according to the intended nature of the filters and an understanding of the way the algorithms above have been provided.

Modifications may be made to the example above as would be apparent to persons skilled in the art of video image manipulation, and to persons skilled in the art of Internet home page design and set-up. These and other modifications may be made without departing from the ambit of the invention the nature of which is to be determined from the foregoing description and the appended claims.

What is claimed is:

1. A method of relaying digital video data, said method including:

providing a first set of digital data of a first frame representing a first scene of a video image, assembling data of one or more filters, and parameters therefor to be applied to the digital data over a plurality of repeated frames of the first scene, providing a second set of digital data of a second frame representing a second scene of a video image, assembling data of one or more filters, and parameters therefor to be applied to the digital data over a plurality of repeated frames of the second scene, relaying the first and second sets of digital data and the data of the filters, and parameters therefor, together with transition data, On a single file, from a first location to a second location over a communications medium, and at said second location receiving and reproducing the first and second sets of digital data over the plurality of repeated frames with one or more video filters, and parameters therefor and transition data applied whereby to generate at the second location an apparent video movie over those reproduced video frames, wherein said transition data controls the way in which there is transition between the first and second scenes.

2. A method as claimed in claim 1 wherein the communications medium is the Internet.

3. A method as claimed in claim 1 wherein the filters include one or more of ZOOM, PAN, TILT, DISTORT, MORPH, FADE and other effect filters.

4. A method as claimed in claim 1 wherein the digital data of at least one frame is compressed according to a particular codec prior to relaying over the communications medium, and is decompressed according to the same codec at the another location.

5. A method as claimed in claim 4 wherein a server computer is provided at said one location and a personal computer (PC) is provided at said another location, and wherein the Internet is the communications medium with the server computer being connected to be accessible as a web site on the Internet, and where the digital data and data of the filters and parameters therefor are downloadable from the server by said PC as "Plug-In" files to the PC.

6. A method as claimed in claim 1 wherein each scene is part of a 2-D area, and wherein a floor plan of that area is also relayed from said one location to another location so that said floor plan can be reproduced concurrently with the apparent video.

7. A method as claimed in claim 6 wherein the floor plan includes a rout-of-path line to indicate a path of movement which corresponds with the reproduction of apparent movement of the apparent video.

8. A method as claimed in claim 7 wherein an indicator is displayed with the route-of-path line to indicate an approximate position on the route-of-path of viewing at any given instant of playing of the apparent video.

9. A method as claimed in claim 8 wherein timing data is relayed from the one location to the another location to define an end point time of the line of route-of-path in order that the indicator can be tracked to the end of that line at a required time instant.

10. A method as claimed in claim 9 wherein there are three or more scenes, each with their own data of one or more filters, transitions, and parameters therefor to be applied to the digital data over a plurality of repeated frames of the scenes and wherein all the digital data of a single frame of each scene, and the data of one or more filters, transitions and parameters therefor is relayed in a single file from said first location to said second location, and received and reproduced at said second location as an apparent video including all the scenes.

11. A method as claimed in claim 10 wherein said timing data represents a time of change when the apparent video movie changes from one scene to the next scene so that said indicator will reach a change of direction point on said route-of-path at approximately the same time there is a scene change in the apparent video.

12. A method as claimed in claim 10 wherein digital data of each scene, the time durations thereof, filter and transtions and their start and end times is assembled in one file, data representative of the floor plan of the 2-D area is assembled in another file, and said timing data is assembled in another file, and all three files are relayed from one location to said another location as "plug-in" files, and then used at said another location for the generation of the apparent video movie.

13. A method as claimed in claim 5 wherein the apparent video is controllable at the another location by PLAY and STOP buttons on a video controller displayable on a monitor screen of said personal computer.

14. A method as claimed in claim 12, wherein the digital data of each scene, the time durations thereof, filters and transitions and their start and end times are data of differing file types and wherein said one file has a unique file extension identifying that it is a file containing different file types.

15. A method as claimed in claim 1, wherein the transmission time over the transmission medium is less than that required to transmit digital data of a video movie of the same content if digital data of all of those reproduced video frames were transmitted.

* * * * *